Aug. 10, 1965  T. WEISZ  3,199,398
FIXING PLUG
Filed June 19, 1962
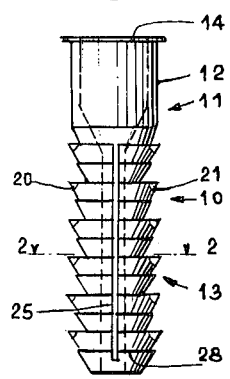
Fig.1
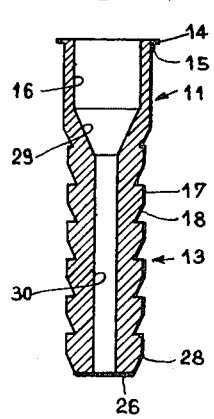
Fig.3
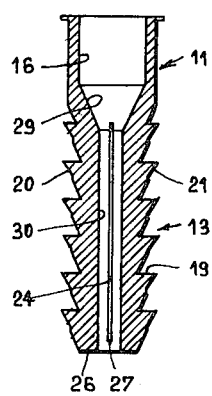
Fig.4
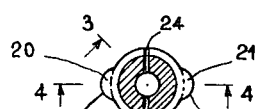
Fig.2   Fig.5
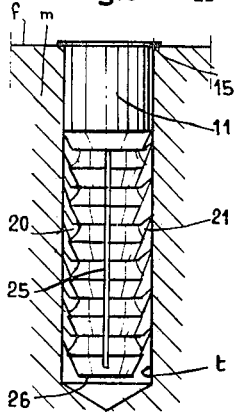
Fig.6
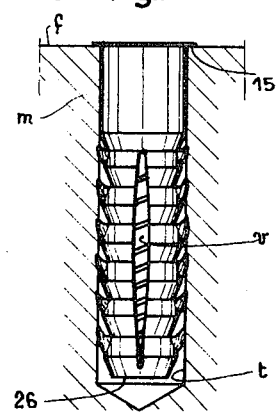
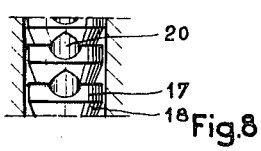
Fig.8
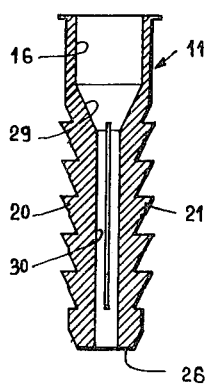
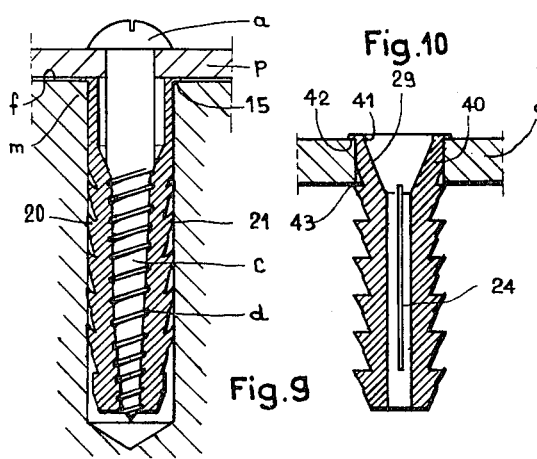
Fig.10   Fig.11
Fig.9
Tibor WEISZ
INVENTOR.
BY Karl F. Ross
AGENT United States Patent Office 3,199,398
Patented Aug. 10, 1965

3,199,398
FIXING PLUG
Tibor Weisz, Route des Charbonniers, Saint-Florentin, Yonne, France
Filed June 19, 1962, Ser. No. 203,643
Claims priority, application France, June 22, 1961, 865,717
2 Claims. (Cl. 85—83)

The present invention has for its object a fixing plug or anchor which is intended to be fixed in a wall of concrete or the like.

The purpose of the invention is to provide a fixing plug of simple construction, which is convenient to use and which provides a strong attachment.

The fixing plug in accordance with the invention can be made of plastic material. Of tubular design, the plug is provided with at least one longitudinal slot, so that the penetration of a screw, nail of the like inside the central passage formed in the plug produces the expansion of the tubular plug-body and the forcible application of the said tubular body against the wall of the hole in which this latter is inserted.

The profile of the fixing plug is usefully designed in such manner that, when the plug is driven into its hole, spaces are accordingly reserved between the plug body and the wall of the hole, thereby permitting the creepage of the material which constitutes the plug, under the action of the member which is driven inside this latter.

As a further useful feature, the outer surface of the plug is provided with projections which are formed by moulding and which, at the time of penetration of the plug inside the hole previously formed in the wall, are bent back and provide increased resistance to withdrawal as a result of the rubbing friction of the said projections against the internal surface of the hole.

The present invention is directed to an embodiment which is suitable for use in conjunction with a screw as an expansion member, and which additionally permits the maintenance by clamping of a plate or like member or unit, the fixing screw thus having a double function.

The invention is also directed to another embodiment which is suitable for the purpose of providing an attachment in a construction element such as a hollow brick having an outer wall of relatively small thickness.

In the description which follows below and which is given by way of example without implied limitation, reference is made to the accompanying drawings, in which:

FIG. 1 is a view in elevation of a plug in accordance with the invention;

FIG. 2 is a view in cross-section taken along the line 2—2 of FIG. 1;

FIG. 3 is a view in cross-section taken along the line 3—3 of FIG. 2;

FIG. 4 is a view in cross-section taken along the line 4—4 of FIG. 2;

FIG. 5 is a partial view in elevation at right angles to FIG. 1, the plug being inserted inside a hole;

FIG. 6 is a view in elevation at right angles to the preceding;

FIG. 7 is a view in elevation of the plug after insertion of a screw or the like;

FIG. 8 is a view similar to FIG. 4, but of another form of embodiment;

FIG. 9 is a view in longitudinal cross-section of a plug in accordance with FIG. 8, after fitting the expansion screw into position;

FIG. 10 is a view in longitudinal cross-section of a plug in accordance with the invention, showing another embodiment fitted into position in a hollow brick prior to insertion of a screw;

FIG. 11 is a view similar to FIG. 10, but after insertion of the screw.

The tubular plug, according to the present invention, as generally designated by the reference numeral 10 comprises, in the embodiment shown in FIGS. 1 to 7, a portion 11 which has a smooth outer surface 12 and which will sometimes be referred-to below as the head, and another portion 13 having an external grooved surface, referred-to as the body. The head 11 has an outer flange 14 which forms a shoulder 15. The internal surface 16 of the head 11 is smooth and cylindrical. The external surface of the body 13 is provided with a succession of cylindrical portions 17 whose generatrices are parallel to the general longitudinal axis of the plug and which are spaced apart by oblique portions 18 which form frusto-conical surfaces, the said oblique portions being joined to the cylindrical portions 17 by means of flat transverse annular shoulders 19. The cylindrical portions 17 are extended at two diametrically opposite zones to form projections 20 and 21, the curvilineal convex contour of which at the level of the annular shoulders 19 can be seen at 22 and 23. The tubular body 13 is provided with two longitudinal oppositely-facing throughgoing slots 24 and 25 along a diameter at right angles to that of the projections 20 and 21. The said slots do not extend to the bottom frontal face 26 of the body so that the extremity 27 of each slot terminates at a small distance short of the said face which is less than the distance of the connecting portion 28 between the end frusto-conical surface and the adjacent cylindrical surface.

The plug which has just been described can be entirely produced in a single operation by molding from a thermoplastic and compressible material, for example of polyethylene.

For the purpose of setting a plug of this type, there is formed in the concrete wall, for example, in which the anchoring is to be effected, a hole $t$ having a depth which is greater than the length of the plug, or, more exactly, a depth which is greater than the distance between the shoulder 15 and the frontal end face 26, while the diameter of the said hole is very slightly greater than that of the cylindrical surfaces 17. When the plug is intended to be fixed in a wall of softer material, the diameter of the hole is preferably slightly smaller than that of the said cylindrical surfaces. The plug is driven into the said hole, if necessary by using a hammer; the projections 20 and 21 are deformed and slightly bent around their point of attachment, then turned backwards (as shown in FIGS. 5 and 6), with the result that when the driving-in of the plug is completed and when the shoulder 15 is brought to bear against the face $f$ of the wall $m$, it is already difficult to withdraw the plug by reason of the resistance to extraction set up by the said projections as a result of rubbing friction.

In order to carry out the fixing operation, a wood screw $v$ or the like, which has in known manner an enlarged head and a body on which is formed a thread, is inserted into the central cavity of the plug which is formed by the cylindrical surface 16, this latter being extended by the frusto-conical surface 29 and the chimney 30 of smaller diameter. Progressively as the insertion of the said screw is effected, the body which is provided with the thread or threads forcibly separates the two semi-cylindrical portions formed by the slots 24 and 25 in the plug body 13 and applies under high pressure the lateral surface of the said plug body 13 against the lateral surface of the hole $t$ (as shown in FIG. 7), while the space formed between the frusto-conical surfaces 18 and the lateral surface of the hole permits the creepage of the material which constitutes the tubular body. The head of the screw is housed inside the compartment formed by the head 11 of the plug.

The plug in accordance with the invention makes it possible to provide an extremely strong anchorage. When using a plug of 8 mm. diameter and a screw of 6 mm. diameter, an engagement is obtained which breaks only under a tractive force of 650 kgs.

Reference will now be made to FIGS. 8 and 9 which illustrate an alternative form. In this alternative form, the longitudinal slots 31 stop at a greater distance from the terminal face 26, substantially at the level of that annular shoulder which is located nearest to the said terminal face. The extremity of the plug is therefore rigid, with the result that at the time of the penetration of a screw and the thread-cutting action of this latter, the said plug extremity plays the part of a nut; it is thus possible to effect the clamping of a plate $p$ or like element or unit between on the one hand the head $a$ of the screw $v$ and the frontal face $f$ of the wall $m$ or the external flange 15, the plug being accordingly called upon to perform a double function. The force of axial compression which is generated increases the resistance to pulling. Under the same conditions as those set forth above, the rupture of the engagement occurs only under a force of 800 kgs.

Reference will now be made to FIGS. 10 and 11 which relate to another form of embodiment. In this form of embodiment, the head 40 is of relatively small depth; the frusto-conical surface 29 is similar to that of the previous embodiments, but the cylindrical surface 41 has a much smaller depth or is even dispensed with.

An arrangement of this kind is particularly useful in the case in which it is desired to carry out a plugging in a hollow brick, the distance between the shouldered portion 42 and the nearest annular shoulder 43 being in that case very little greater than the thickness of the wall $e$ through which the plug is intended to pass. Under the action of the insertion of a screw, nail or the like, the tubular body 13 expands, thereby preventing any withdrawal from taking place. Such a form of embodiment can also be put to use for the purpose of fixation in a wall of concrete or the like. As shown in FIG. 11, it is accordingly possible by this method to clamp a plate or like member, in a manner which is comparable with the form of embodiment shown in FIG. 9.

What I claim is:

1. A wall plug, comprising an elongated tubular body of compressible synthetic resin material open at opposite extremities and formed with a smooth-surfaced interior surface and with a plurality of longitudinally spaced annular cylindrical external surfaces separated by annular frustoconical external surfaces converging inwardly from respective cylindrical surfaces, each of said frustoconical surfaces terminating at the beginning of a next-adjacent one of said cylindrical surfaces to provide a right-angle shoulder therebetween, said body having a leading end and a trailing end and being provided with a bore extending from end to end and with a pair of throughgoing diametrically opposite longitudinal slots lying substantially in a first diametral plane through said body and a respective pair of resilient diametrically opposite arcuately convex projections on each of said cylindrical surfaces diverging in the direction of said trailing end and lying in a second common diametral plane of said body perpendicular to the first-mentioned plane, said projections having radial thicknesses decreasing from their junction with the respective cylindrical surface and having upper surfaces constituting substantially continuations of the respective shoulders, said slots terminating short of said ends to provide circumferentially continuous end portions of said body, said body having an enlarged head at said trailing end.

2. A plug as defined in claim 1 wherein said longitudinal slot terminates at a distance from the leading end greater than the sum of the longitudinal length of one of said cylindrical surfaces and the frustoconical surface adjoining it.

References Cited by the Examiner
UNITED STATES PATENTS
1,109,955   9/14   Barrett _____ 85—76
3,094,892   6/63   Topf _____ 85—72

FOREIGN PATENTS
1,240,813   8/60   France.
  589,648   6/47   Great Britain.
  780,878   9/57   Great Britain.
  454,771   2/50   Italy.
  212,836   3/41   Switzerland.

EDWARD C. ALLEN, *Primary Examiner.*